United States Patent [19]

Mizuno et al.

[11] 4,222,926

[45] Sep. 16, 1980

[54] FLAME-RETARDANT THERMOPLASTIC POLYESTER RESIN COMPOSITIONS

[75] Inventors: Shioji Mizuno, Osaka; Norio Enokimoto, Izumi, both of Japan

[73] Assignee: Dainippon Ink & Chemicals, Inc., Tokyo, Japan

[21] Appl. No.: 893,349

[22] Filed: Apr. 4, 1978

[30] Foreign Application Priority Data

Apr. 15, 1977 [JP] Japan .................................. 52/43347

[51] Int. Cl.² .......................... C08K 3/10; C08K 5/02; C08K 5/03; C08K 67/02
[52] U.S. Cl. ........................... 260/40 R; 260/45.7 R; 260/45.7 S; 260/45.75 R; 260/45.75 V; 260/45.75 B; 525/56; 525/57; 525/58; 525/60; 525/165; 525/169; 525/171; 525/176; 525/439; 525/440; 525/441
[58] Field of Search ........... 260/873, 45.75 R, 45.7 R, 260/45.7 S, 45.7 V, 40 R, 45.75 V, 45.75 B; 525/56, 57, 58, 60

[56] References Cited

U.S. PATENT DOCUMENTS

| 3,887,649 | 6/1975 | Takida et al. | 260/873 |
| 3,904,707 | 9/1975 | Gebhart et al. | 260/873 |
| 3,975,354 | 8/1976 | Buxbaum et al. | 260/40 R |
| 3,988,388 | 10/1976 | Alberts et al. | 260/862 |

OTHER PUBLICATIONS

Lyons, *The Chem. and Uses of Fire Retardants*, (Wiley, 1970), pp. 21, 23.

*Primary Examiner*—J. Ziegler
*Attorney, Agent, or Firm*—Sherman & Shalloway

[57] ABSTRACT

A flame-retarding thermoplastic polyester resin composition comprising (1) a polyester obtained from a terephthalic acid or an alkyl ester thereof and a glycol having 2 to 4 carbon atoms, (2) an organohalogen compound, (3) an inorganic flame-retarding supplementary agent, and (4) at least one polymer selected from a saponified polyvinyl acetate having a saponification degree of greater than 50%, an ethylene/vinyl acetate copolymer and a saponified ethylene/vinyl acetate copolymer, and optionally (5) a reinforcing agent; and a process for production thereof.

18 Claims, No Drawings

FLAME-RETARDANT THERMOPLASTIC POLYESTER RESIN COMPOSITIONS

The present invention is concerned with flame-retardant thermoplastic polyester resin compositions. More specifically, the present invention deals with improved flame-retardant thermoplastic polyester resin compositions which even when exposed to flame do not allow the melt to drip.

Thermoplastic polyesters obtained by the reaction of a terephthalic acid or an alkyl ester thereof with a glycol having 2 to 4 carbon atoms, have been extensively used as materials for producing fibers and molded articles. Such polyesters, in general, have melting points higher than 200° C. and have increased resistance against heat. Further, because of their high crystallinity, the thermoplastic polyesters exhibit small water absorption properties. Furthermore, their excellent properties such as mechanical properties, electric properties and resistance against chemicals, make the polyesters very useful materials. Moreover, the compositions obtained by blending a reinforcing agent such as a glass fiber into the polyesters, are used as materials for injection molding owing to their excellent mechanical properties and resistance against heat.

However, these polyesters and reinforcing agent-containing polyesters catch fire if they are brought into contact with a flame and continue to burn even after the source of the flame is removed.

A variety of methods have been proposed to give flame-retardant property to the polyesters. For example, a method by which an organohalogen compound is blended into a polyester (Japanese Patent Publication No. 15,555/69), a method by which a flame-retarding agent such as phosphorus compound is blended into a polyester (Japanese Patent Publication No. 22,958/74), a method by which a flame-retarding agent is included in the polymer skeltal structure of a polyester by a chemical reaction (U.S. Pat. No. 3,883,611), and a method by which an inorganic flame-retarding assistant such as antimony compound is blended into a flame-retarding agent-containing polyester in order to increase the flame-retarding property (U.S. Pat. No. 3,873,491). Although the flame-retardant polyesters obtained by the aforementioned methods are provided with satisfactory flame-retarding properties, they still have a probability of presenting secondary fire, because when they are formed into thin sheets (of a thickness of, for example, less than 1.6 mm), the melt of the polyester exposed to the flame easily undergoes dripping. To prevent the dripping of the melt, it was attempted to incorporate an elongated whiskered substance (i.e., asbestos) into the flame-retarding polyesters (U.S. Pat. No. 3,751,396), to add a tetrafluoroethylene (U.S. Ser. No. 140,596), and to add a fumed colloidal silica (U.S. Ser. No. 176,316). The polyesters obtained according to these methods, however, contain the aforesaid various substances that are not compatible with the polymer. Therefore, when formed into molded articles, the resulting products exhibit poor appearance, poor physical properties and poor stretchability.

Therefore, it is a primary object of the present invention to provide flame-retarding thermoplastic polyester compositions which give good molded articles having excellent physical properties and appearance and which, when exposed to flame, do not allow the melt to drip, as well as to provide a process for producing the same.

Another object of the present invention is to provide polyester resin molded articles having excellent physical properties and appearance and which, even when exposed to flame, do not allow the melt to drip.

Other objects of the present invention will become obvious from the below-mentioned description.

The inventors of the present invention have found that the abovementioned objects of the present invention can be fulfilled by the compositions which are obtained by adding to the polyesters at least one polymer (hereinafter often referred to as a drip-preventing agent) selected from a saponified polyvinyl acetate having a saponification degree of greater than 50%, an ethylene/vinyl acetate copolymer and a saponified ethylene/vinyl acetate copolymer, in addition to a flame-retarding agent (organohalogen compound), an inorganic flame-retarding supplementary agent (metal oxides, etc.) and optionally a reinforcing agent (glass fiber, etc.) and heating and kneading the mixture.

Thus, according to the present invention, there are provided flame-retarding thermoplastic polyester resin compositions comprising;
(1) a polyester obtained from a terephthalic acid or an ester thereof, and a glycol having 2 to 4 carbon atoms;
(2) an organohalogen compound;
(3) an inorganic flame-retarding supplementary agent; and
(4) at least one polymer selected from a saponified polyvinyl acetate having a saponification degree of greater than 50%, an ethylene/vinyl acetate copolymer and a saponified ethylene/vinyl acetate copolymer; and optionally
(5) a reinforcing agent,
as well as a process for producing said compositions by heating and kneading the aforementioned components.

The aforementioned polyester (1) of the present invention obtained from a terephthalic acid or an alkyl ester thereof and a glycol having 2 to 4 carbon atoms may concretely be a polyethylene terephthalate, polypropylene terephthalate or a polybutylene terephthalate. The polyester, usually, has an intrinsic viscosity [$\eta$] of 0.5 to 1.5 deciliters/gram (as measured in a mixture solvent of phenol and ethane tetrachloride at a weight ratio of 6 to 4, at 30° C.). Such polyester (1) is usually synthesized by the polycondensation of a terephthalic acid as an acid component or an alkyl ester thereof with a glycol having 2 to 4 carbon atoms as an alcohol component, i.e., with an ethylene glycol, a propylene glycol or a butylene glycol. Here, less than 40 mole% of the acid component or the alcohol component may be substituted by other acid or alcohol, respectively. Examples of such other acid components are aliphatic dicarboxylic acids such as adipic acid, sebacic acid, and lower alkyl esters thereof; alicyclic dicarboxylic acids such as cyclohexane dicarboxylic acid, and lower alkyl esters thereof; and aromatic dicarboxylic acids such as isophthalic acid and alkyl esters thereof. Examples of such other alcohol components are aliphatic glycols such as 1,3-butane diol, 1,6-hexane diol; alicyclic glycols such as 1,4-cyclohexane dimethanol; and aromatic glycols such as 4,4'-hydroxyethyl-oxyphenyl propane. Further, less than 40% by weight of the polyester (1) may be substituted by a thermoplastic resin such as polyolefin, polystyrene, ABS, acrylic resin, vinyl acetate resin, polyacetal, polycarbonate, polyurethane or the like. Further, a high-molecular weight polyester polyurethane composed of a low-molecular weight polybutylene terephthalate having hydroxyl groups at the terminals (an intrinsic viscosity $[\eta] = 0.15$ to 0.5 diciliter/gram) of which molecular weight is increased by a polyfunctional isocyanate, such as aromatic, aliphatic or alicyclic diisocyanate (Japanese Patent Laid-Open No. 99741/74) may also be used as the polyester (1).

Preferred examples of the alkyl esters of the terephthalic acid used as a starting material of the polyester (1) may be lower alkyl esters, particularly methyl esters and ethyl esters.

The organohalogen compound (2) of the present invention imparts flame-retarding property to the polyester, and possesses two or more chlorine and/or bromine atoms in one molecule. Concrete examples are aliphatic halogen compounds such as tetrabromoethane, 1,2-dibromo-1,1,2,2-tetrachloroethane, 1,2-dibromo-3-chloropropane, 1,2,3-tribromopropane, 1,2,3,4-tetrabromobutane, and chlorinated paraffin; aromatic halogen compounds such as hexabromobenzene, pentabromotoluene, pentabromophenol, tetrabromophthalic anhydride, tetrachlorophthalic anhydride, 3,3′,5,5′-tetrabromobiphenyl ether, 3,3′,5,5′-tetrachlorobiphenyl ether, 3,3′,5,5′-tetrabromobiphenyl sulfide, 3,3′,5,5′-tetrachlorobiphenyl sulfide, 3,5-dichloro-3′,5′-dibromobiphenyl sulfide, 2,4-dichloro-3′,4′,5′-tribromobiphenyl methane, decabromobiphenyl ether, 2,2′,4,4′,6,6′-hexachlorobiphenyl, 2,2′,4,4′,6,6′-hexabromobiphenyl, tetrabromobisphenol A, tetrachlorobisphenol A, or the reaction products of tetrabromobisphenol A with epichlorohydrin, or brominated naphthalene or tetrabromophthalimide; or perchlorocyclodecane, tris-(2,3-dibromopropyl) isocyanulate, tris-(2-bromoethyl) phosphate, tris-(2,3-dichloro)phosphate, tris-(2,3-dibromo) phosphate, tris-(2,4,6-tribromophenyl) phosphate, and the like. Among these compounds, aromatic halogen compounds are most preferred. The aforementioned organohalogen compound (2) may be used in combination with a phosphorus compound such as trimethyl phosphite, dimethyl phosphonate, diamyl phosphonate, tributyl phosphonate, 2-ethylhexyl diphenyl phosphonate, triphenyl phosphate, tricresyl phosphate, or the like.

It is usually suitable that the contents of the organohalogen compound (2) contained in the composition of the present invention range from 2 to 30 parts by weight, preferably from 5 to 20 parts by weight calculated as halogen, per 100 parts by weight of the polyester (1). If this amount is less than 2 parts by weight, the flame-retarding property of the polyester is not sufficiently exhibited. On the other hand, if the amount exceeds 30 parts by weight, the properties of the polyester are remarkably deteriorated.

Examples of the inorganic flame-retarding supplementary agent (3) are oxides, sulfides, halides, borates, metaborates, sulphates, carbonates and hydroxides of metals. These compounds work to further enhance the flame-retarding effects of the organohalogen compound (2) which is used as a flame-retarding agent. Preferred examples of metals constituting the inorganic flame-retarding supplementary agent (3) are antimony, bismuth, arsenic, zirconium, barium, lead and aluminum. Among these metals, antimony, bismuth and arsenic (metals of the Group Vb) are preferred examples, and antimony is a particularly preferred example. Concrete examples of the inorganic flame-retarding supplememtary agent (3) are antimony trioxide, antimony pentoxide, antimony trisulfide, antimony trichloride, antimony pentachloride, antimony tribromide, antimony pentabromide, barium metaborate, lead borate, aluminum hydroxide, zirconium oxide, molybdenum oxide and the like.

It is usually suitable that the contents of the inorganic flame-retarding supplementary agent (3) contained in the composition of the present invention range from 0.5 to 20 parts by weight, preferably from 3 to 10 parts by weight per 100 parts by weight of the polyester (1). If the amount is less than 0.5 part by weight, the flame-retarding property of the polyester is not sufficiently exhibited. If the amount exceeds 20 parts by weight, on the other hand, the properties of the polyester are deteriorated.

As mentioned earlier, the polymer (4) which is used as a drip-preventing agent in the present invention is selected from (i) a saponified polyvinyl acetate having a saponification degree of greater than 50%, (ii) an ethylene/vinyl acetate copolymer, and (iii) a saponified ethylene/vinyl acetate copolymer.

The saponified polyvinyl acetate (i) having a polymerization degree of from 300 to 3,000, and a saponification degree of greater than 50% is usually suitable. Examples are GOHSENOL NL-05 ($\overline{P}=500$, saponification degree of greater than 98.5%, produced by The Nippon Synthetic Chemical Industry Co., Ltd.), GOHSENOL NM-14 ($\overline{P}=1400$, saponification degree of greater than 99%, produced by The Nippon Synthetic Chemical Industry Co., Ldt.), GOHSENOL NH-20 ($\overline{P}=2000$, saponification degree of greater than 99%, produced by The Nippon Synthetic Chemical Industry Co., Ltd.), GOHSENOL GL-08 ($\overline{P}=1100$, saponification degree of greater than 85%, produced by The Nippon Synthetic Chemical Industry Co., Ltd.), and GOHSENOL GH-17 ($\overline{P}=2100$, saponification degree of greater than 85%, produced by The Nippon Synthetic Chemical Industry Co., Ldt.).

The ethylene/vinyl acetate copolymer (ii) should preferably have a vinyl acetate content of greater than 50% by weight and a Mooney viscosity of 10 to 80, and more preferably a vinyl acetate content of 60 to 90% by weight and a Mooney viscosity of 20 to 70. The ethylene/vinyl acetate copolymer (ii) can be prepared by a known polymerization method, or preferably by an emulsion polymerization method. Concrete examples of the ethylene/vinyl acetate copolymer (ii) are EVATHLENE 310 (vinyl acetate content of 70% by weight, Mooney viscosity of 55, a product of Dainippon Ink And Chemicals, Inc.), EVATHLENE 420 (vinyl acetate content of 60% by weight, Mooney viscosity of 35, a product of Dainippon Ink And Chemicals, Inc.), and the like.

Preferred examples of the saponified ethylene/vinyl acetate copolymer (iii) are those which are obtained by saponifying the aforesaid ethylene/vinyl acetate copolymer. The saponification degree may lie over a given range; however, the copolymer should preferably be saponified to an increased degree because it exhibits improved compatibility with the polyester. A concrete example of the saponified ethylene/vinyl acetate copolymer may be a GL Resin (a product of The Nippon Synthetic Chemical Industry Co., Ltd.).

The polymer (4) having higher molecular weight exhibits increased drip-preventing effect (effect for preventing the melt from dripping when the polyester is exposed to flame). However, if the molecular weight is too great, the copolymer may often exhibit decreased compatibility with respect to the polyester. It is usually suitable that the contents of the polymer (4) in the composition of the present invention range from 0.5 to 30 parts by weight, preferably from 1 to 20 parts by weight per 100 parts by weight of the polyester (1). If the amount is smaller than 0.5 part by weight, the drip-preventing effect becomes poor, and if the amount is greater than 30 parts by weight, the compatibility is deteriorated with respect to the polyester. Among the polymers (4), the ethylene/vinyl acetate copolymer (ii) exhibits the most excellent drip-preventing effects. However, the increase of the amount in the composition tends to deteriorate the compatibility with respect to the polyester (1). The saponified product (i) and the saponified product (iii), on the other hand, exhibit somewhat smaller drip-preventing effects, but provide excellent compatibility with respect to the polyester (1). Therefore, it is preferable to use the ethylene/vinyl acetate copolymer (ii) in combination with the saponified polyvinyl acetate (i) or the saponified ethylene/vinyl acetate copolymer (iii), because they help obtain excellent drip-preventing effect even if used in relatively small amounts and, eventually, giving improved compatibility with the polyester. Owing to the use of the polymer (4) which exhibits excellent compatibility with respect to the polyester (1), the present invention makes it possible to obtain molded articles having good appearance with good processability, without deteriorating the mechanical properties of the polyester and often complementing the brittleness of the polyester that is caused by the blended flame-retarding agent.

The composition of the present invention may often contain the reinforcing agent (5). Examples of the reinforcing agent (5) may be a glass fiber, cellulose fiber, cotton fabric, paper, synthetic fiber, metal powder, glass beads, asbestos, calcium silicate, magnesium silicate, talc, and calcium carbonate. The glass fiber is particularly preferred because it serves to strikingly increase the mechanical strength of the composition in proportion to the incorporated amount of the glass fiber, and further contributes to increase the resistance against the heat. Furthermore, the composition of the present invention containing large amounts of the glass fiber exhibits good drip-preventing effect even if the contents of the polymer (4) is small. Preferably, the glass fiber should be treated with a vinyl silane, amino silane or a coupling agent of the epoxy type. The glass fiber may be in the form of either a roving glass or a chopped strand glass. It is desired that the glass fiber present in the molded articles has a length over the range of from 0.01 to 30 mm, preferably from 0.1 to 1 mm.

The reinforcing agent (5) when used in the composition is usually contained in an amount of 7 to 200 parts by weight, preferably from 20 to 150 parts by weight per 100 parts by weight of the polyester (1). If the amount of the reinforcing agent (5) exceeds 200 parts by weight, the processability of the composition becomes poor.

The components for preparing the composition of the present invention can be mixed by a customary manner, but should preferably be mixed using an extruder. When using the extruder, the heating temperature should preferably from 180° to 300° C., and the mixing time should preferably be from 0.2 to 30 minutes.

In addition to the aforementioned components (1) to (5), the composition of the present invention may further contain a nucleating agent, pigments, dyes, plasticizers, parting agent, lubricant, heat stabilizer, anti-oxidizing agent, ultraviolet ray absorbing agent, foaming agent, coupling agent and the like.

The compositions of the present invention will find extensive applications, and are particularly useful for molding applications. Examples of the articles formed from the compositions of the present application will be injection-molded products such as sheets, tubes, coil bobbins, connectors, switches, cases and the like. The compositions of the present invention are particularly suited for the applications where flame-retarding property is required. The compositions can usually be processed by the injection molding method.

The present invention is concretely illustrated below with reference to non-limitative Examples. In all Examples, parts are all by weight.

The flame-retarding properties of each of the Examples are measured and evaluated in accordance with the Subject 94 of Underwriters' Laboratories Standards (UL 94). Sheets of length of 5 inches, width of ½ inch, and thickness of 1/16 inch or 1/32 inch formed by the injection molding are used as test specimens. A blue flame of a height of ¾ inch without yellow tip is used as a source of flame, which is obtained by burning a gas of 1000 BTU composed principally of a methane gas using a burner having an inner diameter of ⅜ inch and a length of 4 inches. A first test is performed by so holding the test piece that its longer side is in a vertical direction, exposing the test piece to the flame for 10 seconds such that the distance between the lower end of the test piece and the upper end of the flame is ⅜ inch, and then removing the source of flame to record the flame-sustaining (flaming) time. Immediately after the flame has extinguished, a second test is performed by exposing again the test specimen to the flame for 10 seconds in the same manner as above, and removing the source of flame to record the flame-sustaining time. If the drips of metal fall from the test piece during these two testing steps, the specimen is evaluated as "melt dripped". If no drip falls, the specimen is evaluated as "melt did not drip". Further, if the flame is extinguished within 10 seconds in the first and second tests accompanied by the non-dripping of melt, the specimen is evaluated as V-0, if the flame is extinguished within 30 seconds accompanied by the non-dripping of melt, the specimen is evaluated as V-1, and if the flame is extinguished within 30 seconds accompanied by the dripping of melt, the specimen is evaluated as V-2.

EXAMPLE 1

51.6 Parts of a polybutylene terephthalate having an intrinsic viscosity $[\eta]=0.8$ dl/g obtained from a dimethyl terephthalate and a 1,4-butane diol by a conventional polymerization method, 10 parts of a decabromobiphenyl ether as a flame-retarding agent, 2.4 parts of antimony trioxide as an inorganic flame-retarding supplementary agent, 30 parts of a chopped strand glass fiber of a length of 3 mm treated with an aminosilane-type coupling agent as a reinforcing agent, 4 parts of an ethylene/vinyl acetate copolymer (EVATHLENE® 310P, a product of Dainippon Ink And Chemicals, Inc.), and 2 parts of a saponified ethylene/vinyl acetate copolymer (GL Resin, a product of the Nippon Synthetic Chemical Industry Co., Ltd.) as drip-preventing agents, were uniformly mixed together. The thus obtained mixture was supplied to a 65-mm fullflighted extruder with vent heated at 250° C., plasticized, kneaded, extruded and cooled to obtain pellets.

Test pieces were prepared from the pellets using an injection molding machine, and measured for their physical properties in accordance with ASTM. The results were as follows: a tensile strength (hereinafter abbreviated as TS) of 1100 kg/cm$^2$; a tensile elongation (hereinafter abbreviated as TE) of 2.5%; a flexural strength (hereinafter abbreviated as FS) of 1500 kg/cm$^2$; and a notched Izod impact strength (hereinafter abbreviated as II) of 8 kg.cm/cm.

In the case of a test piece of a thickness 1/32 inch, the flame-retarding property was evaluated as UL 94 V-0, and the dripping of the melt was not at all recongized. Further, even when the flame of the flame source was brought into contact with the test piece having a thickness of 1/32 inch and maintained under this condition for 60 seconds, the dripping of the melt was not at all exhibited.

Comparative Example 1

The procedure was repeated in the same manner as in Example 1 but without using the dip-preventing agent, and changing the amount of the glass fiber to 27.4 parts, to obtain the following results.

TS was 1150 kg/cm$^2$, TE was 1.5%, FS was 1600 kg/cm$^2$ and II was 5 kg.cm/cm.

In the case of a test piece having a thickness of 1/32 inch, the flame-retarding property was evaluated as UL 94 V-2, and the dripping of melt was recognized. Further, when the test piece having a thickness of 1/32 inch was brought into contact with with flame in the same manner as in Example, the melt started to drip after 15 seconds have passed.

EXAMPLE 2

42.5 Parts of a polyethylene terephthalate having an intrinsic viscosity of $[\eta] = 0.8$ dl/g, 14 parts of an epoxy resin (epoxy equivalent of 1654) obtained by the reaction of a tetrabromobisphenol A with an epichlorohydrin, 3.5 parts of an antimony oxide, 30 parts of a glass fiber, and 4 parts of an ethylene/vinyl acetate copolymer (EVATHLENE® 310P, a product of Dainippon Ink And Chemicals, Inc.) and 6 parts of a 99% saponified polyvinyl acetate (GOHSENOL NH-20, polymerization degree of 2000, a product of The Nippon Synthetic Chemical Industry Co., Ltd.) as drip-preventing agents, were heated and kneaded together in the same manner as in Example 1.

The thus obtained composition was tested in the same manner as in Example 1, to obtain the following results.

TS was 1200 kg/cm$^2$, TE was 2.0%, FS was 1600 kg/cm$^2$, and II was 6 kg.cm/cm. The flame-retarding property was evaluated as UL 94 V-0 (using a test piece having a thickness of 1/32 inch).

The procedure was conducted in the same manner as in Example 2 but using 42.5 parts of a polyester polyurethane obtained by the reaction of 100 parts of a low molecular polybutylene terephthalate having OHV=15 and AN=0 with 5 parts of a diphenylmethane-4,4'-diisocyanate in place of 42.5 parts of the polyethylene terephthalate that was used in Example 2. The results were as follows: TS of 1350 kg/cm$^2$, TE of 2.5%, FS of 1700 kg/cm$^2$, II of 8 kg.cm/cm, and the flame-retarding property was evaluated as UL 94 V-0 (using a test piece having a thickness of 1/32 inch).

EXAMPLE 4

70 Parts of a polybutylene terephthalate having an intrinsic viscosity of $[\eta] = 1.0$ dl/g, 15 parts of a decabromobiphenyl ether, 5 parts of antimony trioxide, and 10 parts of a saponified polyvinyl acetate (GOHSENOL G-17) having a polymerization degree of 2100 and a saponification degree of higher than 86%, were uniformly heated and kneaded at 230° C.

The thus obtained composition was tested in the same manner as in Example 1 to obtain the following results. TS was 600 kg/cm$^2$, TE was greater than 100%, FS was 850 kg/cm$^2$, II was 4 kg.cm/cm, and the flame-retarding property was evaluated as UL 94 V-0 (using a test piece having a thickness of 1/16 inch).

EXAMPLE 5

70 Parts of a polybutylene terephthalate having an intrinsic viscosity of $[\eta] = 1.0$ dl/g, 15 parts of a hexabromobenzene, 5 parts of antimony trioxide and 10 parts of an ethylene/vinyl acetate copolymer (EVATHLENE 310P), were uniformly heated and kneaded at 225° C.

The thus obtained composition was tested in the same manner as in Example 1 to obtain the following results. TS was 550 kg/cm$^2$, TE was greater than 100%, FS was 750 kg/cm$^2$, II was 4 kg.cm/cm, and the flame-retarding property was evaluated as UL 94 V-0 (using a test piece of a thickness of 1/16 inch).

The blending ratios of the compositions of the above Examples, and the test results are tabulated below.

|  |  | Example 1 | Comparative Example 1 | Example 2 | Example 3 | Example 4 | Example 5 |
|---|---|---|---|---|---|---|---|
| Blend | PBT[1] ($[\eta]$ = 0.8) | 51.6 Parts | 51.6 Parts |  |  |  |  |
| Polyester | PBT ($[\eta]$ = 1.0) |  |  |  |  | 70 Parts | 70 Parts |
|  | PBT[2] ($[\eta]$ = 0.8) |  |  | 42.5 Parts |  |  |  |
|  | Polyester polyurethane[3] |  |  |  | 42.5 Parts |  |  |
| Organohalogen compound | DBB[4] | 10 | 10 |  |  | 15 |  |
|  | Flame-retarding epoxy[5] resin |  |  | 14 | 14 |  |  |
|  | HBB[6] |  |  |  |  |  | 15 |
|  | EVA[7] | 4 |  | 4 | 4 |  | 10 |
| Drip-preventing agent | Saponified EVA[8] | 2 |  |  |  |  |  |
|  | Saponified polyvinyl[9] acetate −1 |  |  | 6 | 6 |  |  |
|  | Saponified polyvinyl[10] acetate −2 |  |  |  |  | 10 |  |
| Inorganic flame-retarding[11] supplementary agent |  | 2.4 | 2.4 | 3.5 | 3.5 | 5 | 5 |
| Reinforcing agent[12] |  | 30 | 27.4 | 30 | 30 | 0 | 0 |
| Test Results |  | V-0 | V-2 | V-0 | V-0 | V-0 | V-0 |

-continued

|  |  | Example 1 | Comparative Example 1 | Example 2 | Example 3 | Example 4 | Example 5 |
|---|---|---|---|---|---|---|---|
| Flame-retarding property | UL 94 | (1/32 in.) thick) | (1/32 in. thick) | (1/32 in. thick) | (1/16 in. thick) | (1/16 in. thick) | (1/16 in. thick) |
| Melted and dripped |  | No (after 60 sec.) | Yes (after 15 sec.) | No (after 60 sec.) | No (after 60 sec.) | No (after 60 sec.) | No (after 60 sec.) |
| TS (kg/cm$^2$) |  | 1100 | 1150 | 1200 | 1350 | 600 | 550 |
| TE (%) |  | 2.5 | 1.5 | 2.0 | 2.5 | 100 or more | 100 or more |
| FS (kg/cm$^2$) |  | 1500 | 1600 | 1600 | 1700 | 850 | 740 |
| II (kg.cm/cm) |  | 8 | 5 | 6 | 8 | 4 | 4 |

[1] PBT: Polybutylene terephthalate
[2] PET: Polyethylene terephthalate
[3] Polyester polyurethane: A reaction product of a polybutylene terephthalate having a OH value of 15 and an AN value of 0 with adiphenylmethane-4,4'-diisocyanate
[4] DBB: Decabromobiphenyl ether
[5] Flame-retarding epoxy resin: A reaction product(epoxy equivalent of 1654) of a tetrabromobiphenolA with an epichlorohydrin
[6] HBB: Hexabromobenzene
[7] EVA: An ethylene/vinyl acetate copolymer(EVATHLENE ®310P)
[8] Saponified EVA: A saponified ethylene/vinylacetate copolymer (GL Resin, a product of The Nippon Synthetic Chemical IndustryCo., Ltd.)
[9] Saponified polyvinyl acetate — 1: GOHSENOL NH-20(polymerization degree of 2000, saponificationdegree of 99%, a product of TheNippon Synthetic Chemical Industry Co.,Ltd.)
[10] Saponified polyvinyl acetate — 2: GOHSENOL G-17(polymerization degree of 2100, saponificationdegree of 86%, a product of TheNippon Synthetic Chemical Industry Co.,Ltd.)
[11] Inorganic flame-retarding supplementary agent:Antimony trioxide
[12] Reinforcing agent: Glass fiber

What is claimed is:

1. A flame-retarding thermoplastic polyester resin composition comprising (1) a thermoplastic polyester obtained from a terephthalic acid or an alkyl ester thereof and a glycol having 2 to 4 carbon atoms selected from the group consisting of ethylene glycol, propylene glycol and butylene glycol, (2) 2 to 30 parts by weight, as halogen, per 100 parts by weight of (1) of an organohalogen compound, (3) an inorganic flame-retarding supplementary agent, and (4) 0.5 to 30 parts by weight per 100 parts by weight of (1) of at least one polymer selected from the group consisting of a saponified polyvinyl acetate having a saponification degree of greater than 50%, an ethylene/vinyl acetate copolymer having a vinyl acetate content of greater than 50% by weight and a Monney viscosity of 10 to 80 and a saponified ethylene/vinyl acetate copolymer, and optionally (5) a reinforcing agent.

2. A composition according to claim 1, wherein the polyester (1) has an intrinsic viscosity [η] (as measured in a mixture solvent of phenol and ethane tetrachloride at a weight ratio of 6 to 4, and at 30° C.) of 0.5 to 1.5 deciliters per gram.

3. A composition according to claim 1, wherein the organohalogen compound (2) contains two or more halogen atoms selected from the group consisting of chlorine, bromine atoms and mixtures thereof in one molecule.

4. A composition according to claim 1, wherein the inorganic flame-retarding supplementary agent (3) is an oxide, sulfide, halide, borate, metaborate, sulfate, carbonate or hydroxide of a metal.

5. A composition according to claim 1, wherein the polymer (4) is said ethylene/vinyl acetate copolymer having a vinyl acetate content of greater than 50% by weight and a Mooney viscosity of 10 to 80, or said saponified product of the ethylene/vinyl acetate copolymer.

6. A composition according to claim 1, wherein the reinforcing agent (5) is present and is a glass fiber, cellulose fiber, cotton fabric, paper, synthetic fiber, metal powder, glass beads, asbestos, calcium silicate, magnesium silicate, talc or calcium carbonate.

7. A composition according to claim 1, wherein the content of the inorganic flame-retarding supplementary agent (3) is 0.5 to 20 parts by weight per 100 parts by weight of the polyester (1).

8. A composition according to claim 1, wherein the content of the reinforcing agent (5) is 7 to 200 parts by weight per 100 parts by weight of the polyester (1).

9. The composition according to claim 1 wherein the organohalogen compound (2) is an aromatic halogen compound containing 2 or more halogen atoms selected from the group consisting of chlorine, bromine atoms and mixtures thereof in the molecule; the inorganic flame-retarding supplememtary agent (3) is selected from the group consisting of antimony trioxide, antimony pentoxide, antimony trisulfide, antimony trichloride, antimony pentachloride, antimony tribromide, antimony pentabromide, barium metaborate, lead borate, aluminum hydroxide, zirconium oxide and molybdenum oxide; and the polymer (4) is an ethylene/vinyl acetate copolymer having a vinyl acetate content of greater than 50% by weight and a Mooney viscosity of 10 to 80 or a mixture of the ethylene/vinyl acetate copolymer with saponified polyvinyl acetate having a saponification degree of greater than 50% of a saponified ethylene/vinyl acetate copolymer.

10. The composition of claim 1 wherein the polyester (1) consists essentially of polyethylene terephthalate, polypropylene terephthalate or polybutylene terephthalate.

11. The composition of claim 1 wherein the polyester (1) is a polyalkylene terephthalate selected from the group consisting of polyethylene terephthalate, polypropylene terephthalate and polybutylene terephthate or a mixture of said polyalkylene terephthalate with less than 40% by weight of a thermoplastic resin selected from the group consisting of polyolefin, polystyrene, acrylonitrile-butadiene-styrene polymer, acrylic resin, vinyl acetate resin, polyacetal, polycarbonate and polyurethane.

12. The composition according to claim 9 wherein the content of the inorganic flame-retarding supplementary agent (III) is 0.5 to 20 parts by weight per 100 parts by weight of the polyester (1).

13. The composition according to claim 12 wherein the reinforcing agent (5) is selected from the group consisting of glass fiber, cellulose fiber, cotton fabric, paper, synthetic fiber, metal powder, glass beads, asbestos, calcium silicate, magnesium silicate, talc or calcium carbonate and is present in an amount of from 7 to 200 parts by weight per 100 parts by weight of the polyester (1).

14. A shaped article obtained by molding a flame-retarding thermoplastic polyester resin composition of claim 1.

15. The composition according to claim 7 wherein the content of the reinforcing agent (5) is 7 to 200 parts by weight per 100 parts by weight of the polyester (1).

16. A shaped article obtained by molding a flame-retarding thermoplastic polyester resin composition of claim 15.

17. A process for producing a flame-retarding thermoplastic polyester resin composition comprising heating and kneading (1) a thermoplastic polyester obtained from a terephthalic acid or an alkyl ester thereof and a glycol having 2 to 4 carbon atoms selected from the group consisting of ethylene glycol, propylene glycol and butylene glycol, (2) 20 to 30 parts by weight, as halogen, per 100 parts by weight of (1) of an organohalogen compound, (3) an inorganic flame-retarding supplementary agent, and (4) 0.5 to 30 parts by weight per 100 parts by weight of (1) of at least one polymer selected from the group consisting of a saponified polyvinyl acetate having a saponification degree of greater than 50%, an ethylene/vinyl acetate copolymer having a vinyl acetate content of greater than 50% by weight and a Mooney viscosity of 10 to 80 and a saponified ethylene/vinyl acetate copolymer, and optionally (5) a reinforcing agent.

18. A process according to claim 17, wherein the heating and kneading is performed using an extruder at a temperature of 180° to 300° C. and for a period of 0.2 to 30 minutes.

* * * * *

UNITED STATES PATENT AND TRADEMARK OFFICE
CERTIFICATE OF CORRECTION

PATENT NO. : 4,222,926
DATED      : September 16, 1980
INVENTOR(S) : MIZUNO, ET AL.

It is certified that error appears in the above—identified patent and that said Letters Patent is hereby corrected as shown below:

Claim 1, line 15, delete "Monney" and insert -- Mooney --

Signed and Sealed this

Twenty-third Day of December 1980

[SEAL]

Attest:

SIDNEY A. DIAMOND

Attesting Officer

Commissioner of Patents and Trademarks